(12) United States Patent  (10) Patent No.: US 7,277,222 B2
Kim et al.  (45) Date of Patent: Oct. 2, 2007

(54) APPARATUS AND METHOD FOR WAVELENGTH CONVERSION AND CLOCK SIGNAL EXTRACTION USING SEMICONDUCTOR OPTICAL AMPLIFIERS

(75) Inventors: Dong Churl Kim, Daejeon (KR); Min Yong Jeon, Daejeon (KR); Young Ahn Leem, Daejeon (KR); Eun Deok Sim, Daejeon (KR); Kyung Hyun Park, Daejeon (KR); Sung Bock Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 11/491,646

(22) Filed: Jul. 24, 2006

(65) Prior Publication Data

US 2007/0070493 A1   Mar. 29, 2007

(30) Foreign Application Priority Data

Sep. 26, 2005  (KR)  ................. 10-2005-0089517
Dec. 8, 2005   (KR)  ................. 10-2005-0119285

(51) Int. Cl.
*H01S 3/00* (2006.01)
(52) U.S. Cl. ............................................. 359/344
(58) Field of Classification Search ............. 372/21; 359/344
See application file for complete search history.

(56) References Cited

U.S. PATENT DOCUMENTS 6,335,819 B1 * 1/2002 Cho et al. .................... 359/333
6,636,318 B2 * 10/2003 Sarathy et al. ............... 356/477
6,731,873 B1 * 5/2004 Zuhdi et al. ................... 398/41

(Continued)

FOREIGN PATENT DOCUMENTS

JP   2004326087 A  * 11/2004

OTHER PUBLICATIONS

Mao et al. All-Optical Clock Recovery From RZ-Format Data by Using a Two-Section Gain-Coupled DFB Laser. Journal of Lightwave Technology. vol. 20. No. 9. Sep. 2002.*

(Continued)

*Primary Examiner*—Deandra M Hughes
(74) *Attorney, Agent, or Firm*—Ladas & Parry LLP (57) ABSTRACT

Provided is an apparatus and method for simultaneous optical wavelength conversion and optical clock signal extraction using semiconductor optical amplifiers (SOAs). The apparatus includes: a wavelength converter receiving a pump beam having input information and a probe beam having a different wavelength from the pump beam, and outputting the pump beam with an overshoot shifted to a red wavelength and an undershoot shifted to a blue wavelength due to non-linear characteristics and self-phase modulation of semiconductor optical amplifiers (SOAs) and the probe beam delivered the input information from the pump beam; an optical divider dividing output paths of the probe beam to which the input information has been delivered and the pump beam having the overshoot and the undershoot; a converted-wavelength extractor filtering the probe beam received from the optical divider; and a clock data regenerator obtaining a pseudo return-to-zero (PRZ) signal from the pump beam received from the optical divider and extracting a clock signal from the PRZ signal.

The apparatus and method can simultaneously perform wavelength conversion and optical clock signal extraction on an NRZ signal using an optical method, without converting the NRZ signal into an electrical signal.

6 Claims, 5 Drawing Sheets

U.S. PATENT DOCUMENTS

| | | | |
|---|---|---|---|
| 7,010,235 B2* | 3/2006 | Ueno | 398/178 |
| 2002/0063944 A1 | 5/2002 | Kim et al. | |
| 2002/0176157 A1 | 11/2002 | Dave et al. | |
| 2003/0169473 A1* | 9/2003 | Cotter et al. | 359/245 |
| 2004/0212872 A1* | 10/2004 | Auge et al. | 359/333 |
| 2005/0259698 A1* | 11/2005 | Park et al. | 372/18 |

OTHER PUBLICATIONS

Mao et al. All-Optical Enhancement of Clock and Clock-to-Data Suppression Ratio of NRZ Data. IEEE Photonics Technology Letters. vol. 13. No. 3. Mar. 2001.*

All-Optical NRZ-to-PRZ Converter at 10 Gb/s Based on Self-Phase Modulation of Fabry-Perot Laser Diode. IEEE Photonics Technology Letters. vol. 16. No. 4. Apr. 2004.*

Optical Signal Procssing Based on Self-Induced Polarization Rotation in A Semiconductor Optical Amplifier. Journal of Lightwave Technology. vol. 22. No. 2. Feb. 2004.*

'Simultaneous Clock Component Extraction and Wavelength Conversion of NRZ Signal Using an SOA Loop Mirror' Hong et al., vol. 16, No. 4, Apr. 2004, 2004 IEEE, pp. 1116-1118, Photonics Technology Letters.

'All-optical clock recovery from NRZ data with simple NRZ-to-PRZ converter based on self-phase modulation of semiconductor optical amplifier' Lee et al., Electronic Letters, Jun. 10, 1999, vol. 35, No. 12, pp. 989-990.

* cited by examiner

APPARATUS AND METHOD FOR WAVELENGTH CONVERSION AND CLOCK SIGNAL EXTRACTION USING SEMICONDUCTOR OPTICAL AMPLIFIERS

BACKGROUND OF THE INVENTION

This application claims the priority of Korean Patent Application Nos. 10-2005-0089517 and 10-2005-0119285, filed on Sep. 26, 2005 and Dec. 8, 2005, respectively, in the Korean Intellectual Property Office, the disclosure of which is incorporated herein in its entirety by reference.

1. Field of the Invention

The present invention relates to an apparatus and method for simultaneous all-optical wavelength conversion and clock signal using semiconductor optical amplifiers (SOAs), and more particularly, to converting wavelengths from non return-to-zero (NRZ) format data based on non-linearities of SOAs and, at the same time, obtaining a pseudo return-to-zero (PRZ) signal from the non return-to-zero (NRZ) and an optical clock signal from the obtained PRZ signal by using time dependent gain-saturation and self-phase modulation (SPM) experienced by the NRZ data while passing through the SOAS.

2. Description of the Related Art

When non-return-to-zero (NRZ) data signals are used in optical communications, it is possible to use hardware with smaller bandwidth in NRZ transmission than in return-to-zero (RZ). Therefore, the costs of parts needed in the systems can be reduced.

However, since NRZ signals have much weaker clock signal components than RZ signals, studies have been investigated to extract optical clock signal components from the NRZ signal.

For example, optical clock signal extraction from an NRZ signal is based on self-phase modulation (SPM) experienced by the NRZ passing through semiconductor optical amplifiers (SOAs).

In general, a leading edge of an NRZ signal amplified by an SOA includes an overshoot that has strong clock signal components.

The overshoot due to self-phase modulation (SPM) is shifted to the red optical wavelengths.

Therefore, a pseudo return-to-zero (PRZ) signal can be extracted from the NRZ by filtering the red-shifted optical wavelengths using a narrow line width filter. (H. J. Lee et al., Electron. Lett. 35 (12), 989 (1999)).

However, a conventional wavelength converter using SOAs extracts a probe beam to obtain a wavelength-converted signal and filter out a pump beam having an overshoot shifted to the red optical wavelengths due to self-phase modulation.

Attempts have been doing to simultaneously perform wavelength conversion and optical clock signal extraction. Wavelength converter can reduce blocking caused by wavelength collisions in a wavelength division multiplexing (WDM) communications network and increase flexibility and capacity of the network by reusing wavelength.

W. Hong et al., IEEE Photon, Technol. Lett., 16, 200 (2004) discloses a non-linear loop mirror having SOAs which convert the wavelength of an NRZ signal and extract a PRZ signal from the NRZ signal.

U.S. Patent No. 2002-0063944 (Donghwan Kim and others) discloses a ring-type semiconductor optical fiber laser converting wavelengths at an ultra-high speed without using an external pump beam and, at the same time, a clock pulse generator producing an optical pulse string phase-locked with input data signal by injection-mode-locking.

In detail, an ultra-high speed optical wavelength converter composed of the ring-type semiconductor optical fiber laser is possible to perform simultaneously wavelength conversion without an external pump beam and extraction all optical phase locking signal.

However, since the ultra-high speed optical wavelength converter uses four wave mixing, it is sensitive to the polarization of an incident signal and is rarely used due to its questionable stability and unreliability.

SUMMARY OF THE INVENTION

Generally, a pump beam passing through a wavelength converter filter out using an optical filter. However, a leading edge of pump beam, a non-return-to-zero (NRZ) format signal, still has strong clock component and the corresponding wavelength moves toward a red wavelength due to self-phase modulation. When the leading edge of pump beam that shifted to the red wavelength is selected, an optical clock signal can be extracted.

In this regard, optical wavelength conversion and optical clock signal-extraction can be simultaneously performed on a probe beam and a pump beam using non-linearities and self-phase modulation of semiconductor optical amplifiers (SOAs).

The present invention provides an apparatus and method for simultaneously performing wavelength conversion and optical clock signal extraction using all-optical method and without using an electrical device which simultaneously performs wavelength conversion using non-linearities of SOAs, and clock signal extraction using self-phase modulation.

According to an aspect of the present invention, there is provided an apparatus for wavelength conversion and optical clock signal extraction, the apparatus including: a wavelength converter receiving a pump beam having input information and a probe beam having a different wavelength from the pump beam, and outputting the pump beam with an overshoot shifted to a red wavelength and an undershoot shifted to a blue wavelength due to non-linear characteristics and self-phase modulation semiconductor-optical amplifiers (SOAs) and the probe beam delivered the input information from the pump beam; an optical divider dividing output paths of the probe beam to which the input information has been delivered and the pump beam having the overshoot and the undershoot; a converted-wavelength extractor filtering the probe beam received from the optical divider; and a clock data regenerator obtaining a pseudo return-to-zero (PRZ) signal from the pump beam received from the optical divider and extracting a optical clock signal from the PRZ signal.

According to another aspect of the present invention, there is provided a method of wavelength conversion and clock signal extraction, the method including: receiving a pump beam having input information and a probe beam having a different wavelength from the pump beam, and outputting the pump beam with an overshoot shifted to a red wavelength and an undershoot shifted to a blue wavelength due to non-linear characteristics and self-phase modulation of SOAs and the probe beam delivered the input information from the pump beam; dividing output paths of the probe beam to which the input information has been delivered and the pump beam having the overshoot and the undershoot; filtering the probe beam received from the optical divider;

and obtaining a PRZ signal from the pump beam received from the optical divider and extracting a optical clock signal from the PRZ signal.

According to another aspect of the present invention, there is provided a optical clock signal extraction apparatus including: an optical band-pass filter obtaining a PRZ signal from an overshoot of a pump beam shifted to a red wavelength and an undershoot of the pump beam shifted to a blue wavelength due to self-phase modulation of the pump beam within SOAs; an optical amplifier increasing an extinction ratio of the PRZ signal; and an optical clock regenerator extracting an optical clock signal from the PRZ signal having the increased extinction ratio.

According to another aspect of the present invention, there is provided a clock signal extraction method including: obtaining a PRZ signal passing through an optical band-pass filter an overshoot of a pump beam shifted to a red wavelength and an undershoot of the pump beam shifted to a blue wavelength due to self-phase modulation of the pump beam within SOAs; increasing an extinction ratio of the PRZ signal; and extracting an optical clock signal from the PRZ signal having the increased extinction ratio.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth therein; rather, these embodiments are provided so that this disclosure will be thorough and complete, and will fully convey the concept of the invention to those skilled in the art.

Figure 1:
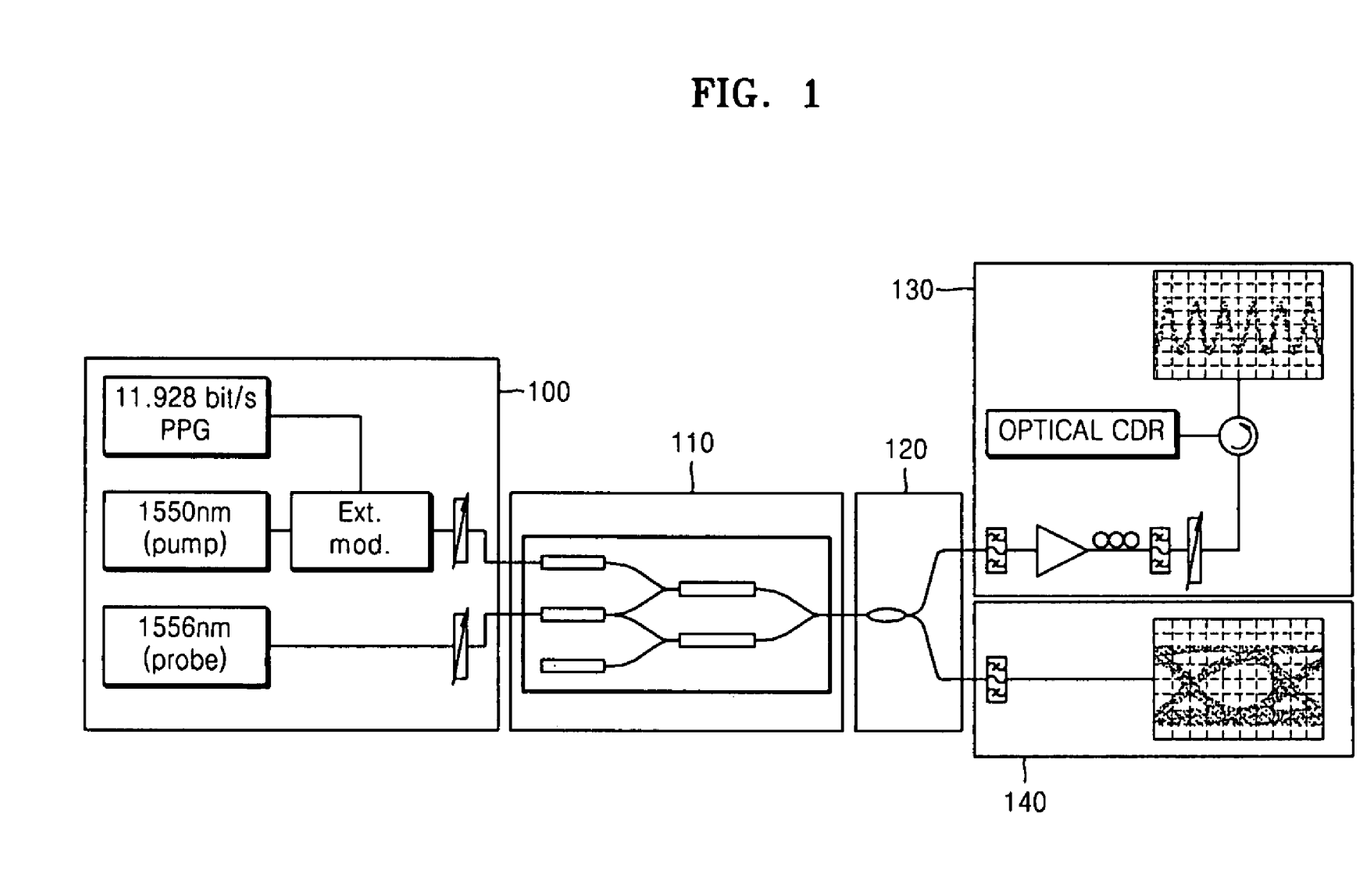
FIG. 1 is a block diagram of an apparatus for wavelength conversion and optical clock signal extraction using semiconductor optical amplifiers (SOAs) according to an embodiment of the present invention.

FIG. 1 is a block diagram of an apparatus for wavelength conversion and clock signal extraction using semiconductor optical amplifiers (SOAs) according to an embodiment of the present invention.

Referring to FIG. 1, an input signal generator 100 generates a pump beam ($\lambda$=1550 nm) which is an 11.928 Gbit/s non-return-to-zero (NRZ) format data. The wavelength converter 110 receives both the modulated pump beam and the probe beam ($\lambda$=1556 nm) together and provides the NRZ data of the pump beam to the probe beam using non-linearities of the SOAs in order to achieve the wavelength conversion.

The wavelength converter 110 uses a SOA-based wavelength conversion structure such as a Michelson interferometer, a Mach-Zehnder interferometer, a delay interferometer, a semiconductor laser amplifier in a loop mirror (SLA-LOM), or a semiconductor optical asymmetric demultiplexer (TOAD).

Wavelength conversion is conducted by using non-linearities of SOAs, a cross-phase modulation (XPM) or a cross-gain modulation (XGM).

The wavelength converter 110 is a Mach-Zehnder interferometric converter and uses the cross-phase modulation.

The pump beam ($\lambda$=1550 nm) which is modulated 11.928 Gbit/s NRZ format data is varied a carrier density in an SOA, part of the interferometer and the variation of the carrier density results in change of a refractive index of the SOA.

The variations in the refractive index of the SOA cause phase modulation of the probe beam ($\lambda$=1556 nm), the output beam with desired wavelength ,and then the amplitude modulation of the probe beam.

It is just a process that the NRZ data is duplicated from the modulated pump beam to the probe beam. In other words, wavelength conversrion is performed by filtering only the probe beam ($\lambda$=1556 nm), the desired wavelength beam, after the probe beam has been provided with NRZ data from the modulated pump beam ($\lambda$=1550 nm).

Wavelength converters using the cross-phase modulation have limited applications due to its narrow dynamic range of pump beam intensity. However, the wavelength converter 110 according to the present embodiment includes preamplifiers at an input end of the SOAs, thereby broadening the dynamic range.

An optical divider 120 divides the intensity of the wavelength-converted signal, the probe beam which is having NRZ data by using non-linearities of the SOAs, and of the pump beam having the overshoot that shifted to the red wavelength due to the self-phase modulation.

The optical divider 120 may be a 3-dB coupler dividing the intensity of the probe and pump beams each other. Alternatively, the optical divider 120 may be a wavelength division multiplexing (WDM) splitter or demutiplexer since the probe beam and the pump beam have different wavelength each other. When the 3-dB coupler is used, an optical band filter is required to obtain the probe beam and filter out the pump beam.

A clock and data regenerator 130 obtains a pseudo return-to-zero (PRZ) signal having many clock signal components from the overshoot that shifted to the red wavelength and gets a clock signal by inputting the obtained PRZ signal to an optical clock and data recovery (CDR). An output unit 140 obtain the probe beam having the NRZ data Information duplicated therein from the modulated pump beam in the wavelength converter 110 by filtering the probe beam outputted from the wavelength converter 110.

Figure 2:
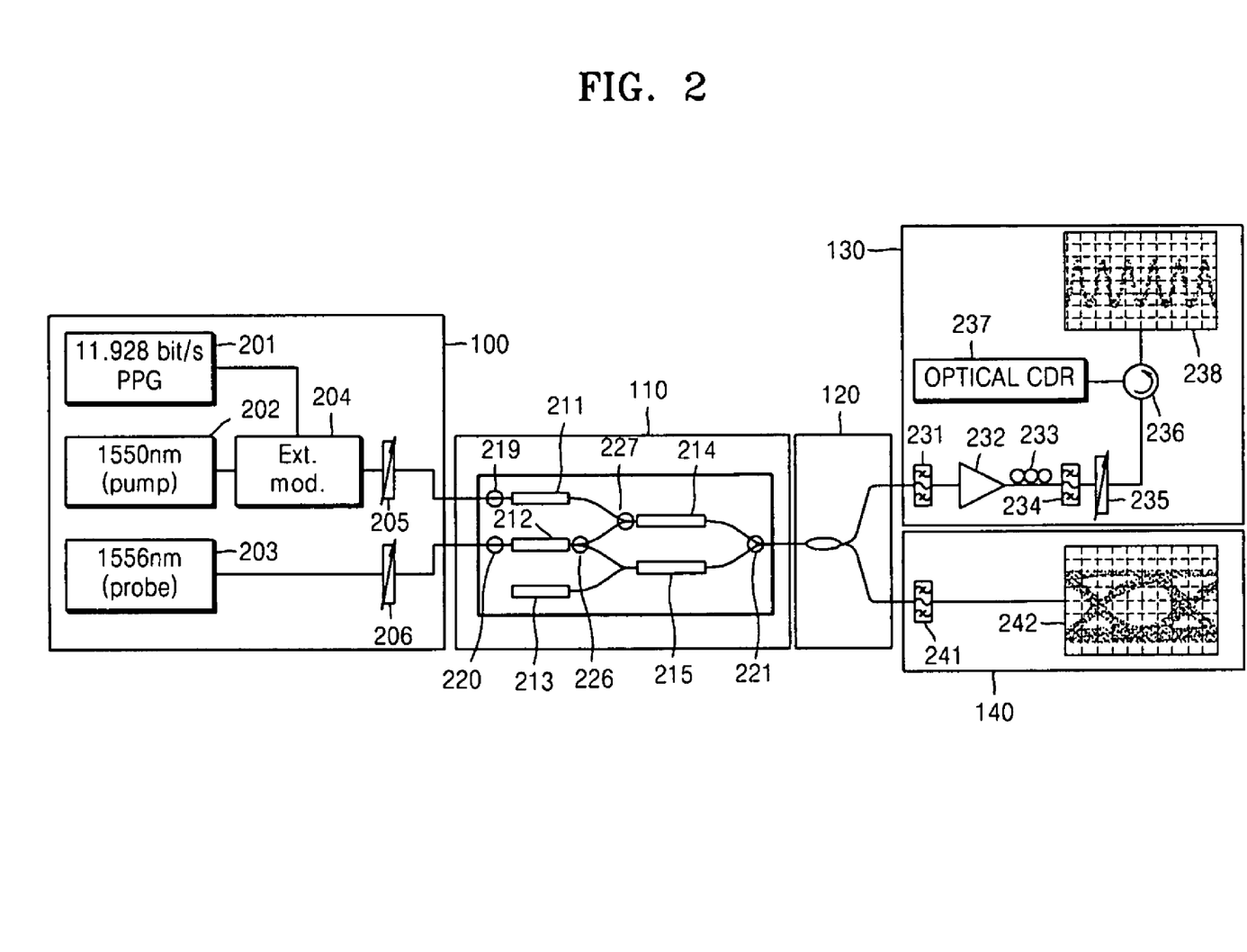
FIG. 2 is a detailed block diagram of the apparatus of FIG. 1.

FIG. 2 is a detailed block diagram of the apparatus of FIG. 1.

Referring to FIG. 2, a continuous wave (CW) pump beam 202 is emitted from a 1550 nm light source and is input to an external modulator 204 to produce an 11.928 Gbit/s NRZ signal. The external modulator 204 modulates the CW pump beam 202 in response to a pulse pattern, an output signal of a pulse pattern generator and obtains the 11.928 Gbit/s NRZ signal.

A CW probe beam 203 with a 1556 nm wavelength is generated and input to a wavelength converter 110 together with the modulated CW pump beam 202. At this time, the optical powers of the CW pump beam 202 and the CW probe beam 203 can be adjusted using optical attenuators 205 and 206.

The wavelength converter 110 is a Mach-Zehnder interferometric wavelength converter and includes 600 µm preamplifiers 211, 212 and 213 in an input unit thereof. The preamplifiers 211, 212 and 213 linearly amplify the incident pump beam 202 and the probe beam 203 when the intensity of these signals is small.

To avoid non-liner effects, the preamplifiers 211,212 and 213 must be operated in a region in which gain saturation does not occur.

The length of SOAs 214 and 215 is 1200 µm to producing cross-phase modulation. The pump beam 202 modulated by the external modulator 204 is incident to an incident unit 219, and the probe beam 203 is incident to an incident unit 220.

The probe beam 203 passes through the preamplifiers 212, a 3-dB optical divider 226, and the SOAs 214 and 215, sequentially. The modulated pump beam 202 passes through the preamplifiers 211 a 3-dB optical coupler 227. Then, the modulated pump beam 202 and the probe beam 203 divided by the 3-dB optical divider 226 pass through the SOA 214.

The variation the intensity of the pump beam 202 creates the refractive index variation of the SOA 214. Accordingly, the refractive index variation results in the phase modulation of the probe beam 203 in the SOA 214. The probe beam 203 phase-modulated in the SOA 214 and the probe beam 203 not phase-modulated obtained at output from the SOA 215 are combined by an optical coupler 221. When a phase difference between the phase-modulated probe beam in the SOA 214 and the phase-unmodulated probe beam in the SOA 215 is 180 degrees, wavelength conversion occurs due to cross-phase modulation. A conventional wavelength converter obtains a wavelength-converted signal by filtering the probe beams 203 and filtering out the pump beam at the output of the optical coupler 221 using a band-pass filter.

The modulated pump beam passes through the preamplifier 211 and the SOA 214. A leading edge of the NRZ signal, the modulated pump beam 204 passes through the SOA 214 has an overshoot, and a wavelength corresponding to the overshoot is shifted to a red wavelength.

In detail, an optical divider 120, that is, the 3-dB coupler, divides the intensity of the pump beam 202 and the probe beam 203 into 50:50 each other, and only the probe beam 203 is passed through a band-pass filter 241 to obtain a wavelength-converted signal 242.

Instead of the 3 dB coupler, a WDM splitter or demultiplexer which can transmit a beam in a desired direction according to wavelength may be used. In this case, the modulated pump beam 204 is bound for a clock regenerator 130 which regenerates a clock signal, and the probe beam 203 is bound for an extractor 140 which extracts a wavelength-converted signal, thereby reducing an unintended optical loss.

Using the band-pass filter 231, which has a narrow transmission wavelength bandwidth (0.25 nm), an overshoot having many clock signal components is selected from the modulated pump beam 204. Since the overshoot of the pump beam 202 is shifted to the red wavelength, the transmission wavelength of the band-pass filter 231 may be slightly longer than the 1550 nm wavelength of the modulated pump beam 204.

The undershoot of the modulated pump beam 204 is shifted to the blue wavelength region.

Therefore to get PRZ signal from the undershoot shifted to the blue wavelength, the transmission wavelength of the band-pass filter 231 may be slightly shorter than the 1550 nm wavelength of the modulated pump beam 204.

When a filter which can simultaneously filter the overshoot of the leading edge shifted to the red wavelength and the undershoot of the falling edge shifted to the blue wavelength is used, a better PRZ signal can be obtained.

A NRZ signal of the pump beam 202 passing through the band-pass filter 231 is converted to the PRZ signal. An extinction ratio of the PRZ signal is increased using an optical fiber amplifier 232.

After amplified spontaneous emission (ASE) of the optical fiber amplifier 232 is removed using a band-pass filter 234, the intensity of the modulated pump beam 204 is adjusted using a variable optical attenuator 235.

When an output signal of the variable optical attenuator 235 is incident to an optical CDR 237, the optical CDR 237 regenerates an optical clock signal 238 injection-locked with the PRZ signal which is obtained from the modulated pump beam 204 and extracts the optical clock signal 238 using a circulator 236. The optical CDR 237 may also be an electrical CDR.

If the optical CDR 237 is insensitive to polarization, a polarization controller 233 may not be used. In addition, the optical fiber amplifier 232 and the variable optical attenuator 235 may not be used, depending on the configuration of the clock and data regenerator 130.

Figure 3A:
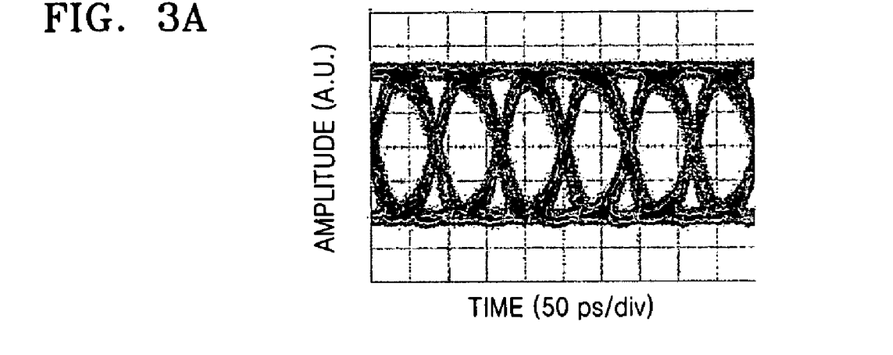
FIG. 3A illustrates a non return-to-zero (NRZ) signal incident to a wavelength converter of the apparatus of FIG. 1.

FIG. 3A illustrates an eye-diagram of an NRZ signal incident to the wavelength converter 110 of the apparatus of FIG. 1. FIG. 3C illustrates an eye-diagram of a PRZ signal before being incident to the optical CDR 237, the PRZ signal being extracted from the overshoot of the leading edge of the modulated pump beam 204.

Figure 3B:
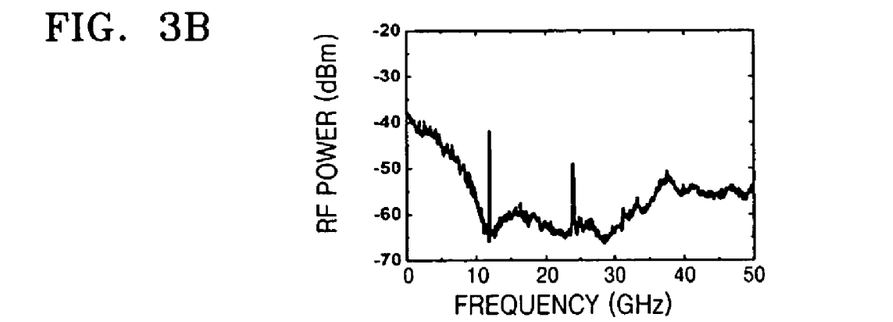
FIG. 3B illustrates a radio frequency (RF) spectrum of an incident pseudo random binary sequence (PRBS) NRZ signal.
Figure 3C:
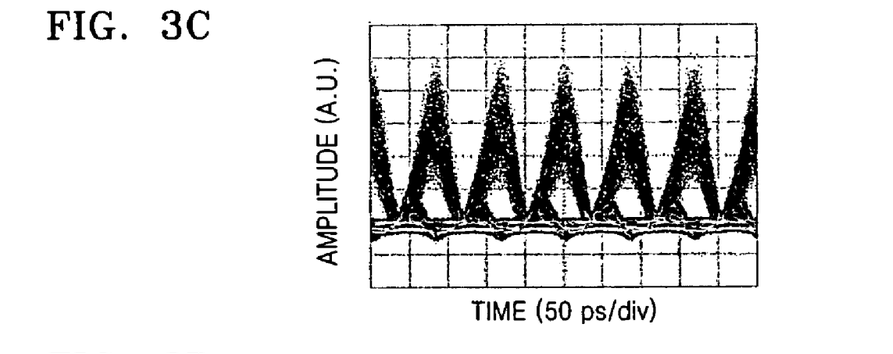
FIG. 3C illustrates a pseudo return-to-zero (PRZ) signal extracted from an NRZ signal at the output terminal of the wavelength converter.
Figure 3D:
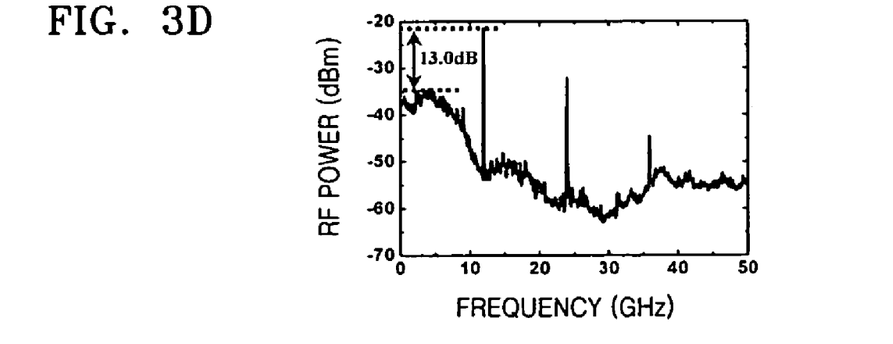
FIG. 3D illustrates an RF spectrum of a PRZ signal extracted from an NRZ signal at the output terminal of the wavelength converter.

FIG. 3B illustrates a radio frequency (RF) spectrum of an incident pseudo random binary sequence (PRBS) NRZ signal. Referring to the RF spectrum of 3B, there are weak clock signal components in the PRBS NRZ signal. FIG. 3D illustrates an RF spectrum of a PRBS PRZ signal with a converted format. Referring to the RF spectrum of FIG. 3D, the signal-to-noise ratio of an RF component of the 11.928 Gbit/s PRBS PRZ signal has improved to approximately 13 dB.

Figure 4A:
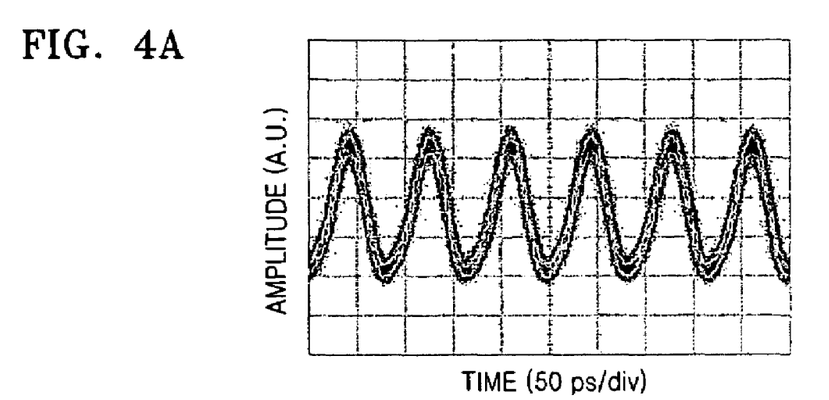
FIG. 4A illustrates a waveform of an optical clock signal regenerated by an optical clock and data recovery.
Figure 4B:
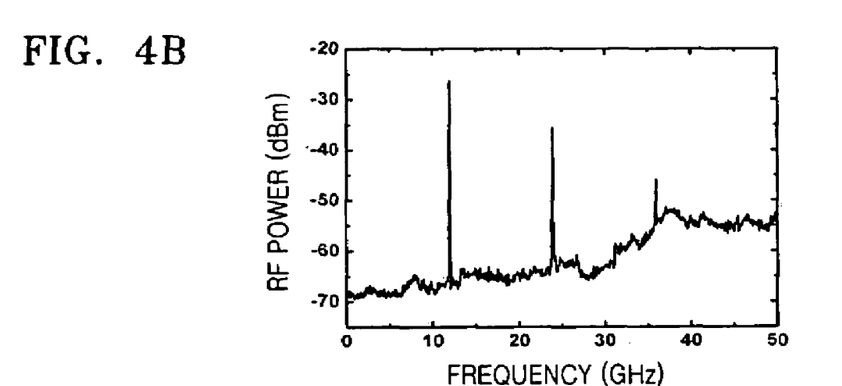
FIG. 4B illustrates an RF spectrum of the regenerated optical clock signal signal.

FIG. 4A illustrates a waveform of an optical clock signal regenerated by the optical clock and data recovery 237. FIG. 4B illustrates an RF spectrum of the regenerated optical clock signal.

By injection locking the optical CDR237 with the extracted PRZ from the modulated pump beam, the optical clock signal as illustrated in FIG. 4A is extracted. In addition, a much better RF signal as illustrated in FIG. 4B can be obtained.

Figure 5:
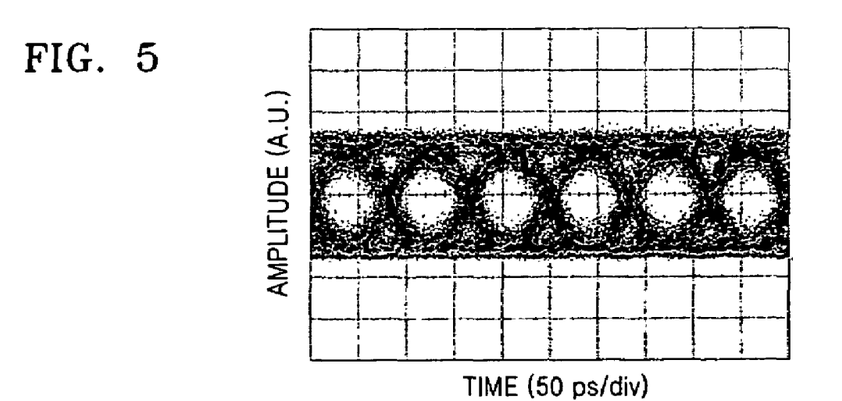
FIG. 5 is an eye-diagram of a wavelength-converted signal according to an embodiment of the present invention.

FIG. 5 illustrates a wavelength-converted signal obtained from a probe beam. The extinction ratio of the wavelength-converted signal of FIG. 5 is approximately 9.0 dB.

Figure 6:
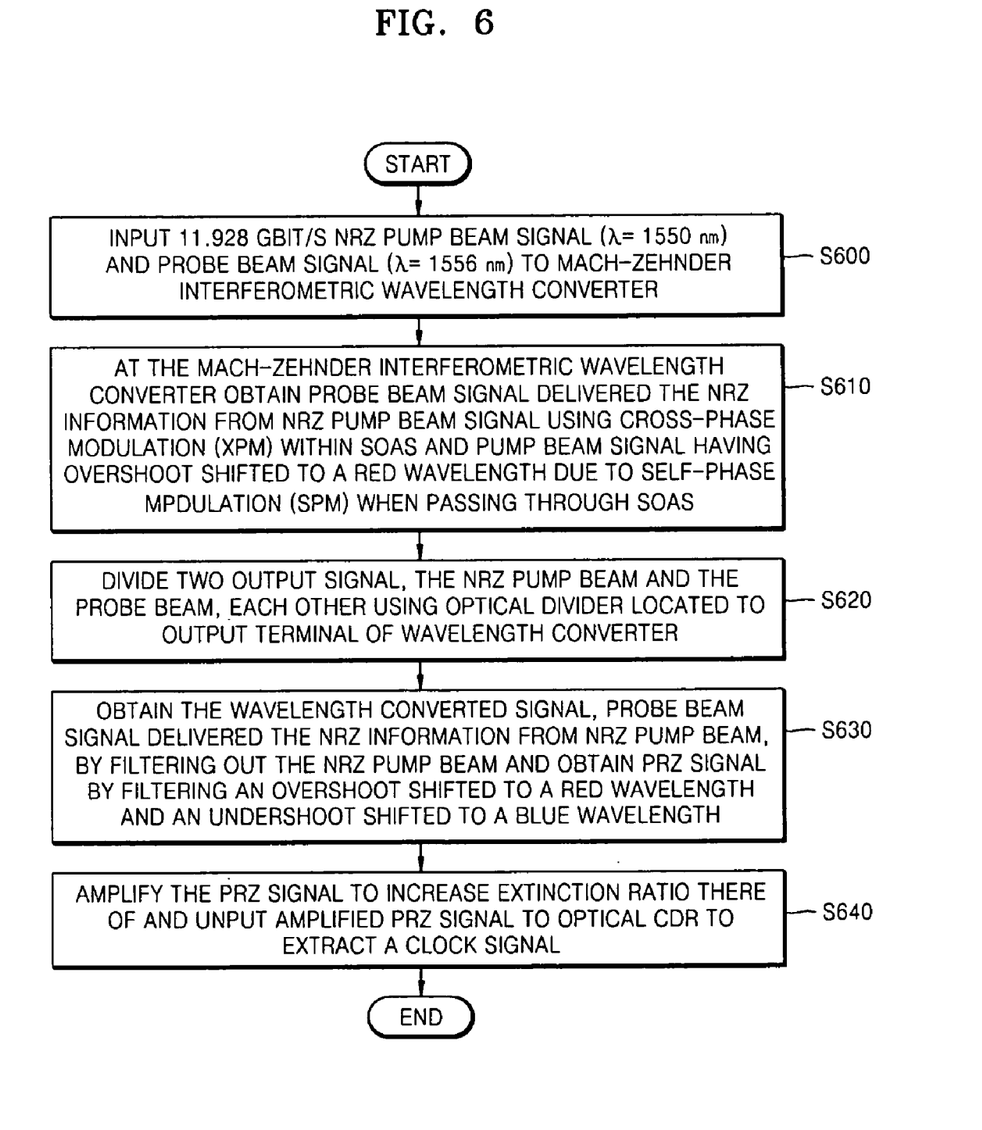
FIG. 6 is a flowchart illustrating a method of wavelength conversion and optical clock extraction performed by the apparatus of FIG. 1 according to an embodiment of the present invention.

FIG. 6 is a flowchart illustrating a method of wavelength conversion and clock signal extraction performed by the apparatus of FIG. 1 according to an embodiment of the present invention.

Referring to FIG. 6, an 11.928 Gbit/s NRZ modulated pump 204 ($\lambda$=1550 nm) and a CW probe beam signal 203 ($\lambda$=1556 nm) are input to the Mach-Zehnder interferometric wavelength converter 110 (operation S600). The probe beam signal delivered NRZ data information from the NRZ pump beam signal, using the cross phase modulation (XPM) of the SOAs 214 and 215, and the pump beam signal, which has an overshoot that has shifted to a red wavelength due to self-phase modulation of the modulated pump beam signal when passing through the SOAs 214 and 215 are obtained (operation S610).

The optical divider 120 located at an output terminal of the wavelength converter 110 divides the intensity the probe beam signal and the modulated pump beam signal (operation S620).

A wavelength-converted signal is obtained by filtering the probe signal delivered the NRZ data using band-pass filter and a PRZ signal is obtained by filtering the overshoot of the modulated pump beam shifted to the red wavelength using band-pass filter (S630).

The PRZ signal is passed through the optical fiber amplifier 232 to increase the extinction ratio thereof and is input to the optical CDR 237 to extract an optical clock signal from the PRZ signal (operation S640).

As described above, the present invention can simultaneously perform wavelength conversion and optical clock signal extraction on an NRZ signal using a purely optical method and without using an electrical device. Since the present invention can perform wavelength conversion and optical clock signal extraction, it is very economical and has many applications.

Instead of a PRZ signal generated at SOA-based loop mirror laser, the present invention can generate a non-inversion wavelength-converted signal. Therefore, an additional circuit is not required.

A wavelength converter of the present invention using the cross-gain modulation (XGM) or the cross-phase modulation (XPM) is less sensitive than to polarization of a former wavelength converter using four wave mixing and can thus be widely used due to its stability and reliability.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for wavelength conversion and clock signal extraction, the apparatus comprising:
    a wavelength converter receiving an input pump beam having input information and an input probe beam having a different wavelength from the input pump beam, and outputting a signal comprising:
        a pump beam with an overshoot component shifted to a red wavelength and an undershoot component shifted to a blue wavelength due to non-linear characteristics and sell-phase modulation of semiconductor optical amplifiers (SOAs); and
        a probe beam having the input information of the pump beam duplicated therein;
    an optical divider dividing output paths of the probe beam having the input information duplicated therein and the pump beam having the overshoot component and the undershoot component;
    a converted-wavelength extractor filtering out the probe beam from the signal received from the optical divider; and
    a clock data regenerator obtaining a pseudo return-to-zero (PRZ) signal from the pump beam of the wavelength converted signal received from the optical divider and extracting a clock signal from the PRZ signal.

2. The apparatus of claim 1, wherein the wavelength converter is a Michelson interferometric wavelength converter or a Mach-Zehnder interferometric wavelength converter or a delay interferometric wavelength converter.

3. The apparatus of claim 1, wherein the optical divider is a 3 dB coupler or a wavelength division multiplexing (WDM) divider or demutiplexer.

4. A method of wavelength conversion and clock signal extraction, the method comprising:
    receiving an input pump beam having input information and an input probe beam having a different wavelength from the pump beam and outputting an wavelength converted signal comprising a pump beam with an overshoot component shifted to a red wavelength and an undershoot component shifted to a blue wavelength due to non-linear characteristics and self-phase modulation of SOAs and a probe beam having the input information of the pump beam duplicated therein;
    dividing output paths of the probe beam and the pump beam of the wavelength converted signal;
    filtering the probe beam received from the optical divider; and
    obtaining a PRZ signal from the pump beam received from the optical divider and extracting a clock signal from the PRZ signal.

5. The apparatus of claim 1 further comprising a clock signal extraction apparatus comprising:
    an optical band-pass filter obtaining a PRZ signal from an overshoot of a pump beam shifted to a red wavelength and an undershoot of the pump beam shifted to a blue wavelength due to self-phase modulation of the pump beam within SOAs;
    an optical amplifier increasing an extinction ratio of the PRZ signal; and
    a clock data regenerator extracting a clock signal from the PRZ signal having the increased extinction ratio.

6. The method of claim 4 further comprising:
    obtaining a PRZ signal passing through an optical band-pass filter an overshoot of a pump beam shifted to a red wavelength and an undershoot of the pump beam shifted to a blue wavelength due to self-phase modulation of the pump beam within SOAs;
    increasing an extinction ratio of the PRZ signal; and
    extracting a clock signal from the PRZ signal having the increased extinction ratio.

* * * * *